United States Patent
Schellenberg et al.

[11] Patent Number: 5,886,666
[45] Date of Patent: Mar. 23, 1999

[54] AIRBORNE PSEUDOLITE NAVIGATION SYSTEM

[75] Inventors: Susan R. Schellenberg; Michael G. Farley, both of Cedar Rapids, Iowa

[73] Assignee: Rockwell International, Costa Mesa, Calif.

[21] Appl. No.: 116,391

[22] Filed: Jul. 16, 1998

[51] Int. Cl.$^6$ ............................... H04B 7/185; G01S 5/02
[52] U.S. Cl. ......................... 342/357; 701/214; 701/215
[58] Field of Search ............................. 342/357; 701/214, 701/215

[56] References Cited

U.S. PATENT DOCUMENTS

| | | | |
|---|---|---|---|
| 5,311,194 | 5/1994 | Brown | 342/357 |
| 5,686,924 | 11/1997 | Trimble et al. | 342/357 |
| 5,786,773 | 7/1998 | Murphy | 342/357 |

*Primary Examiner*—Theodore M. Blum
*Attorney, Agent, or Firm*—Kyle Eppele; James P. O'Shaughnessy

[57] ABSTRACT

Disclosed are systems, pseudolite transmitters, receivers, and methods of using the same to navigate. An airborne pseudolite transmitter transmits a first spread spectrum signal indicative of a first fixed location spaced apart from a current actual position of the transmitter. The airborne pseudolite transmitter also transmits a corrections signal indicative of a vector error correction between the first fixed location and the current actual position of the transmitter. A receiver receiving the first spread spectrum signal and the corrections signal calculates its location in response thereto.

20 Claims, 8 Drawing Sheets

AIRBORNE PSEUDOLITE NAVIGATION SYSTEM

FIELD OF THE INVENTION

The present invention relates to navigational and positioning systems. More particularly, the present invention relates to a navigational system which is similar to a global navigational satellite system (GNSS), but which allows navigation when satellite signals from GNSS satellites are too weak or are unavailable. The present invention also relates to pseudolite navigation systems used to augment navigation with a current GNSS.

BACKGROUND OF THE INVENTION

Global navigational satellite systems (GNSS) are known and include the global positioning system (GPS) and the Russian global orbiting navigational satellite system (GLONASS). GNSS-based navigational systems are used for navigation and positioning applications. In a GPS navigational system, GPS receivers receive satellite positioning signals from a set of up to 32 satellites deployed in 12-hour orbits about earth and dispersed in six orbital planes at an altitude of 10,900 nautical miles. Each GPS satellite continuously transmits two spread spectrum, L-band signals: an L1 signal having a frequency f1 of 1575.42 MHz, and an L2 signal having a frequency f2 of 1227.6 MHz. The L1 signal from each satellite is modulated by two pseudo-random codes, the coarse acquisition (C/A) code and the P-code. The P-code is normally encrypted, with the encrypted version of the P-code referred to as the Y-code. The L2 signal from each satellite is modulated by the Y-code. The C/A code is available for non-military uses, while the P-code (Y-code) is reserved for military uses.

Conventional GPS navigational systems determine positions by timing how long it takes the coded radio GPS signal to reach the receiver from a particular satellite (e.g., the travel time). The receiver generates a set of codes identical to those codes (e.g., the P-code or the C/A-code) transmitted by the satellites. To calculate the travel time, the receiver determines how far it has to shift its own codes to match the codes transmitted by the satellites. The determined travel times for each satellite are multiplied by the speed of light to determine the distances from the satellites to the receiver.

By receiving GPS signals from four or more satellites, a receiver unit can accurately determine its position in three dimensions (e.g., longitude, latitude, and altitude). A conventional GPS receiver typically utilizes the fourth satellite to accommodate a timing offset between the clocks in the receiver and the clocks in the satellites. The GPS signals also include a 50 bit per second data stream or data message which is superimposed on the C/A and P-codes. Once the receiver has matched its code to the code in the GPS signal from a particular satellite, the receiver can decipher the data message. The data message can include navigational data related to the position of the satellite, including geometric dilution of precision (GDOP) parameters. Additionally, the data message can include accurate time data, ephemeris data, and data related to the health status of the satellite. The GPS satellites utilize code division multiple access techniques so satellite signals do not interfere with each other. GLONASS navigational systems operate similarly to GPS navigational systems and utilize frequency division multiple access (FDMA) techniques so satellite signals do not interfere with each other.

GNSS navigational systems have tremendous benefits over other positioning and navigational systems because these systems do not rely upon visual, magnetic or other points of reference. However, conventional GNSS navigational systems can experience blackout areas or regions when GNSS satellites are not within line-of-sight of the receiver. Further, GNSS systems are susceptible to jamming by higher power signals.

Conventional ground based pseudo-satellite (pseudolite or PL) navigation systems are based on a fixed location, for each pseudolite transmitter, that does not vary with time. Attempts to expand a ground based pseudolite (GPL) system by substituting an airborne pseudolite (APL) transmitter for a GPL transmitter result in highly inaccurate navigation solutions. Airborne pseudolite systems which attempt to broadcast the changing position of the APL transmitter likely require a unique pseudolite downlink signal structure. The requirements for a new downlink data structure result in significant development requirements for the receiver and added complexity in the pseudolite.

SUMMARY OF THE INVENTION

Disclosed are systems, pseudolite transmitters, receivers, and methods of using the same to navigate. An airborne pseudolite transmitter transmits a first spread spectrum signal indicative of a first fixed location spaced apart from a current actual position of the transmitter. The airborne pseudolite transmitter also transmits a corrections signal indicative of a vector error correction between the first fixed location and the current actual position of the transmitter. A receiver receiving the first spread spectrum signal and the corrections signal calculates its location in response thereto. In an alternative embodiment, instead of transmitting a corrections signal the transmitter modifies a code modulating the spread spectrum signal such that it appears from the receiver's location to have been transmitted from the fixed location.

DETAILED DESCRIPTION OF THE PREFERRED EMBODIMENTS

The present invention includes systems and methods for navigating using airborne pseudolite (APL) transmitters, without having to utilize or develop a unique pseudolite (PL) data downlink structure. The APL system locates pseudolite transmitters on aircraft that are generally orbiting constant positions. The approach of the present invention diverges from other proposed methods by transmitting from each of the APL transmitters the constant positions, and also time varying error offsets on an alternate datalink or frequency, to allow the receiver to compute the true APL positions.

Figure 1:
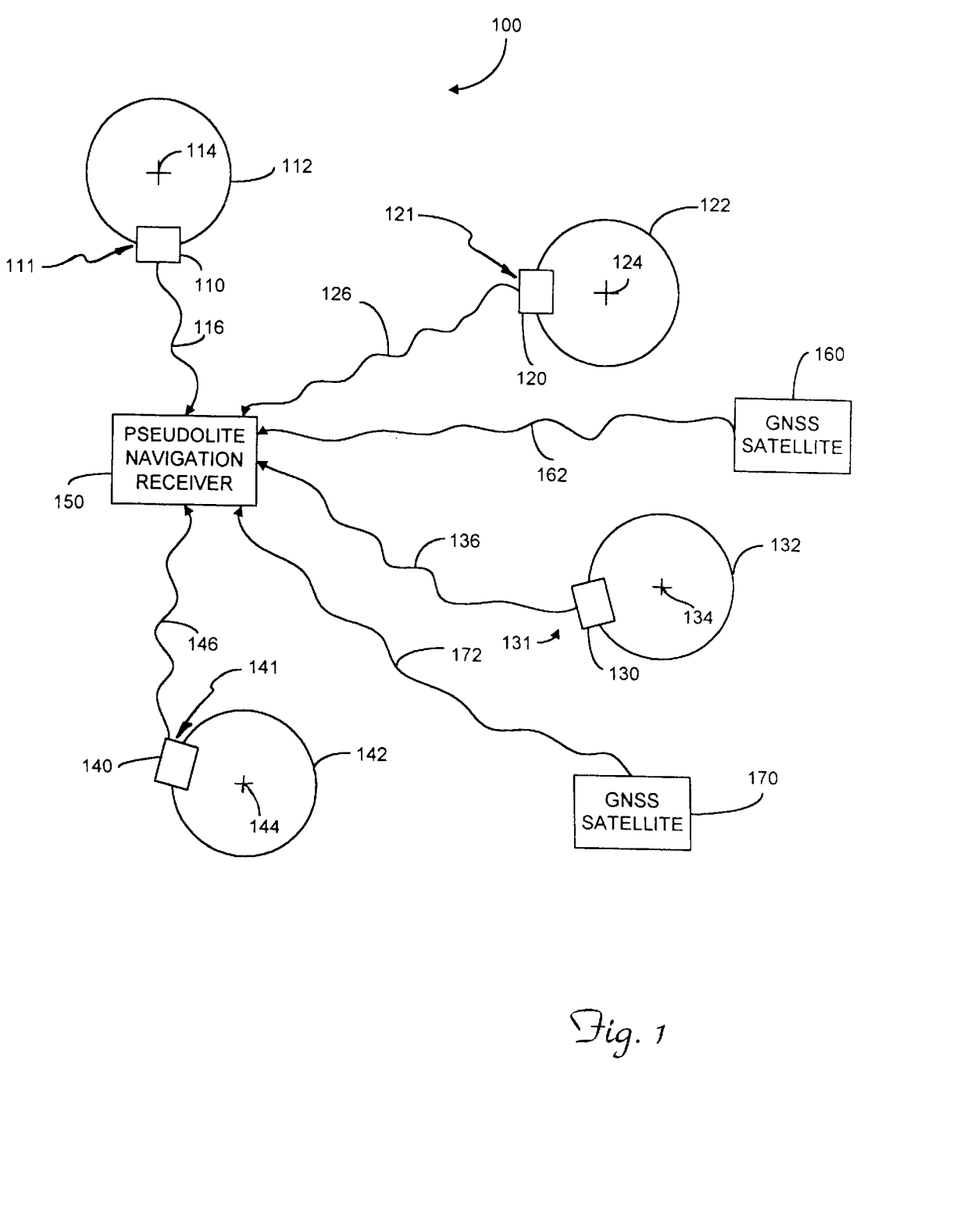
FIG. 1 is a diagrammatic illustration of an airborne pseudolite (APL) navigation system in accordance with preferred embodiments of the present invention.
Figure 2:
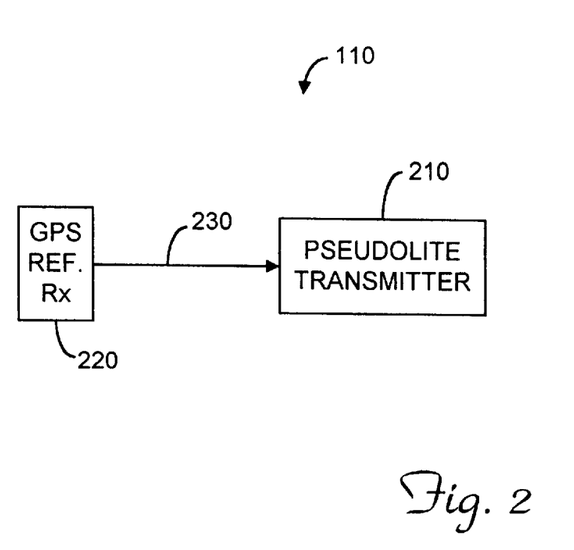
FIG. 2 is a block diagram illustrating an APL transmitter in accordance with the present invention.

FIG. 1 is a diagrammatic illustration of APL navigation system 100 in accordance with embodiments of the present invention. FIG. 2 is a block diagram illustrating an APL transmitter in accordance with the present invention. Navigation system 100 includes APL transmitter 110, APL transmitter 120, APL transmitter 130, APL transmitter 140 and receiver 150. Receiver 150 determines its current position and/or navigates using signals transmitted by the APL transmitters. In some embodiments of the present invention, receiver 150 determines its position and/or navigates using a combination of signals transmitted from the APL transmitters and signals transmitted from GNSS satellites 160 and 170. While four APL transmitters and two GNSS satellites are illustrated in FIG. 1, in various embodiments of the present invention receiver 150 determines position or navigates with different combinations of numbers of APL transmitters and GNSS satellites.

Each of APL transmitters 110, 120, 130 and 140 transmits a modified version of the conventional GPS satellite ephemeris message that, combined with Keplerian equation changes in receiver 150, sums in the receiver to describe a fixed position. A method of using a modified ephemeris message to transmit a fixed position of a ground based pseudolite (GPL) is disclosed in co-pending and commonly assigned U.S. patent application Ser. No. 08/972,269, filed Nov. 18, 1997, and entitled AUTONOMOUS LOCAL INDOOR AND OUTDOOR NAVIGATIONAL SYSTEM, which is herein incorporated by reference. According to the present invention, the fixed position described in the transmission from each APL transmitter is not the current location of the APL transmitter, but rather an arbitrary fixed point near the aircraft's flight path.

More particularly, while the aircraft on which APL transmitters 110, 120, 130 and 140 are carried are respectively at current positions 111, 121, 131 and 141 of flight paths or orbits 112, 122, 132 and 142, these are typically not the positions described in the L-band ephemeris message transmitted by the APL transmitters. Instead, regardless of where the aircraft carrying the APL transmitters are along their respective flight paths, the ephemeris message transmitted in signal 116 by APL transmitter 110 describes fixed location 114, the ephemeris message transmitted in signal 126 by APL transmitter 120 describes fixed location 124, the ephemeris message transmitted in signal 136 by APL transmitter 130 describes fixed location 134 and the ephemeris message transmitted in signal 146 by APL transmitter 140 describes fixed location 144. It is not necessary for the flight paths of the aircraft carrying the APL transmitters to be circular or to be centered about the fixed locations.

FIG. 2 illustrates APL transmitter 110 in greater detail. APL transmitters 120, 130 and 140 are preferably substantially similar to APL transmitter 110. APL transmitter 110 includes PL transmitter 210 and GNSS reference receiver 220. GNSS reference receiver 220 is a conventional GNSS receiver (typically a GPS receiver) of the type which determines position and a time reference using satellite signals received from a GNSS satellite constellation. Pseudolite transmitter 210 of APL transmitter 110 is synchronized to GNSS (GPS) time through the GNSS (GPS) reference receiver interface 230, and receives constantly updated position information indicative of the actual current location of APL transmitter 110.

Pseudolite transmitter 210 of APL transmitter 110 uses a modified GPS satellite downlink data method in order to describe and broadcast stationary or fixed location 114. Transmitter 110 uses the current estimate of its position received from the GNSS reference receiver 220 to determine a vector error correction between fixed point 114 described by the APL ephemeris broadcast and the actual location 111 of APL transmitter 110. In some embodiments the APL also broadcasts the vector error correction on a separate datalink. Suitably modified GPS receiver 150 can determine the position of stationary location 114 from the pseudolite broadcast (and in conjunction with the corrections data in some embodiments), and navigates either with a combination of APL transmitters and GNSS satellites, or with APL transmitters only. Previously proposed APL systems attempt to update the APL transmitter position in near real time.

APL transmitters 110, 120, 130 and 140 are configured to each broadcast a simulated spread spectrum satellite signal (a pseudolite signal) to provide a ranging signal which can be used by receiver 150 for navigation. The pseudolite signals can be similar to conventional L-band GNSS signals and can include a pseudo-random code as well as data information. The data information preferably includes position information related to the fixed locations near or related to the flight paths of each APL transmitter carrying aircraft. The data information can also include timing information.

A conventional GPS downlink data stream (e.g. data information) includes detailed ephemeris data that allows a GPS receiver to determine the position of a GPS satellite at any given instant in time. The Keplerian equations used by a conventional GPS receiver to predict the position include several time varying constants to aid in prediction of the path of the satellite along its orbit. As a result, an unmodified GPS receiver that receives ephemeris data, from an APL transmitter which describes a fixed position relative to the APL, would try to project a constant motion onto the fixed location as time increments.

The data information in the pseudolite signals from each APL transmitter includes a set of ephemeris data that describes a decaying satellite orbit just prior to impact with the earth. Once the fixed location near each APL transmitter has been established, the ephemeris constants are selected to sum to a constant position. The ephemeris parameters necessary to describe this fixed location (for example fixed location 114) are computed and transmitted in the GPS downlink data words (e.g., the data information).

Receiver 150 preferably has the Keplerian equations modified to remove the time varying constants format of the equations (e.g., the two equations which include time varying constants for pseudolite signal processing). This change allows receiver 150 to continuously determine the location of the APL transmitters to be the stationary locations described by the ephemeris data transmitted by the APL transmitters. Error checking routines implemented in the receiver are also modified to allow for fixed locations. Receiver 150 generally processes the pseudolite signals from the APL transmitters as conventional GPS satellite signals and computes pseudoranges and PVT (position, velocity and time) solutions for the constellation of APL transmitters. Thus, receiver 150 can have a standard GNSS structure similar to a conventional GNSS receiver and can be configured for the constant positions or fixed locations associated with each APL transmitter via software modifications.

Receiver 150 receives the pseudolite signals from at least three APL transmitters and/or GNSS satellites to calculate its location. Receiver 150 is similar to conventional GNSS receivers, except that receiver 150 is optimized to receive the pseudolite signals and to calculate position based upon the pseudolite signals. If at least three APL transmitters are provided as a constellation in system 100, two-dimensional positioning or navigation is possible for receiver 150. If at least four APL transmitters are provided as a constellation in system 100, three-dimensional navigation is possible. As discussed above, if one or more GNSS satellite signals can be acquired, less APL transmitters can be used.

The pseudolite signals are preferably transmitted by the APL transmitters at a higher radio frequency (RF) signal strength (e.g. power level) than the signal strength which is normally used by GLONASS and GPS satellite signals. Thus, the APL transmitters can utilize satellite frequencies, pseudo-random codes, and navigational data structures of GLONASS and/or GPS to the maximum extent possible. Although the APL transmitters are designed to provide a low RF output power, the APL transmitters can transmit with sufficient power to overcome or block any existing GLONASS and GPS signals if navigation using only APL transmitters is desired.

System 100 can utilize code division multiple access (CDMA) techniques to separately receive signals from different APL transmitters transmitting on the same frequency with the same power output. Additionally, system 100 can utilize time division multiple access techniques to reduce near/far problems associated with determining positions close to a particular transmitter. According to the TDMA technique, each transmitter or antenna transmits its signal in a distinct time period. This technique allows a suitably equipped receiver, such as receiver 150, to clearly receive each of the pseudolite signals without interference from stronger nearby APL transmitters. With such a technique, the pseudolite signals must be transmitted according to strict timing requirements so that signals are only transmitted during their allotted time.

Figure 3:
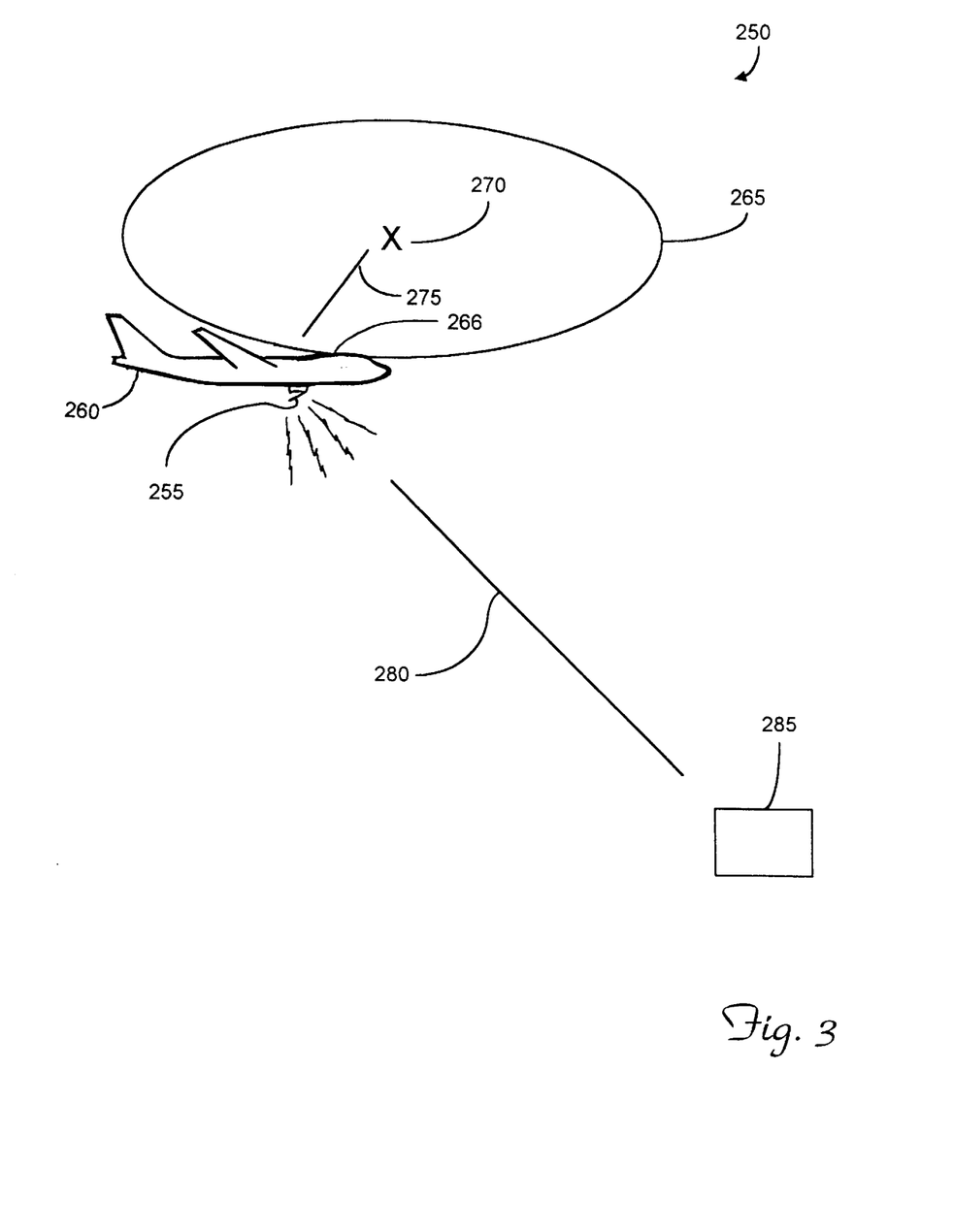
FIG. 3 is a diagrammatic illustration of a portion of an APL navigation system in accordance with first embodiments of the present invention.
Figure 4:
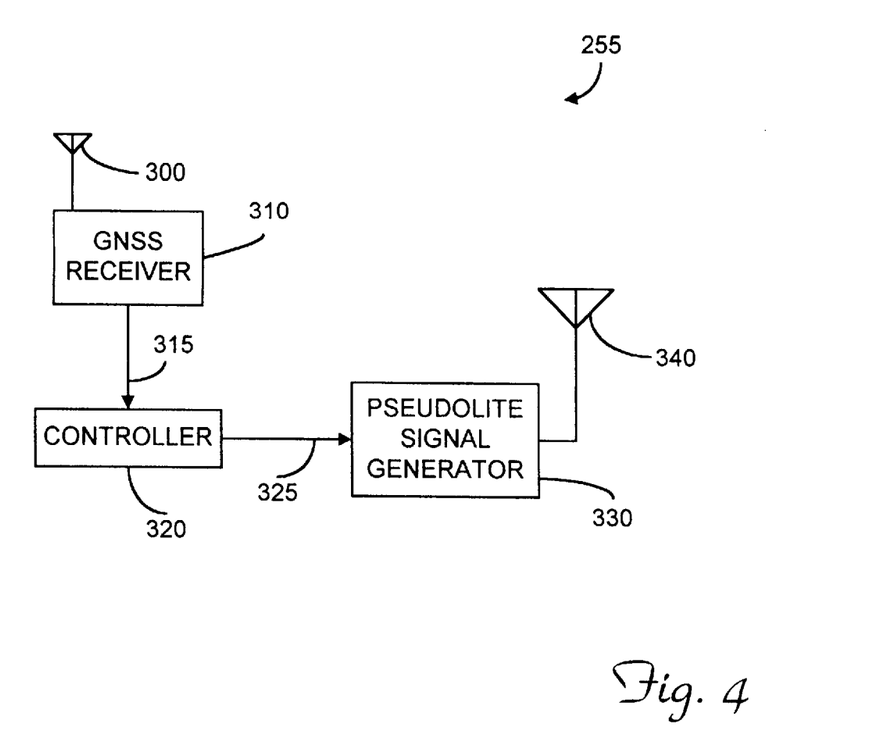
FIG. 4 is a block diagram illustrating an APL transmitter in accordance with the first embodiments of the present invention illustrated in FIG. 3.
Figure 5:
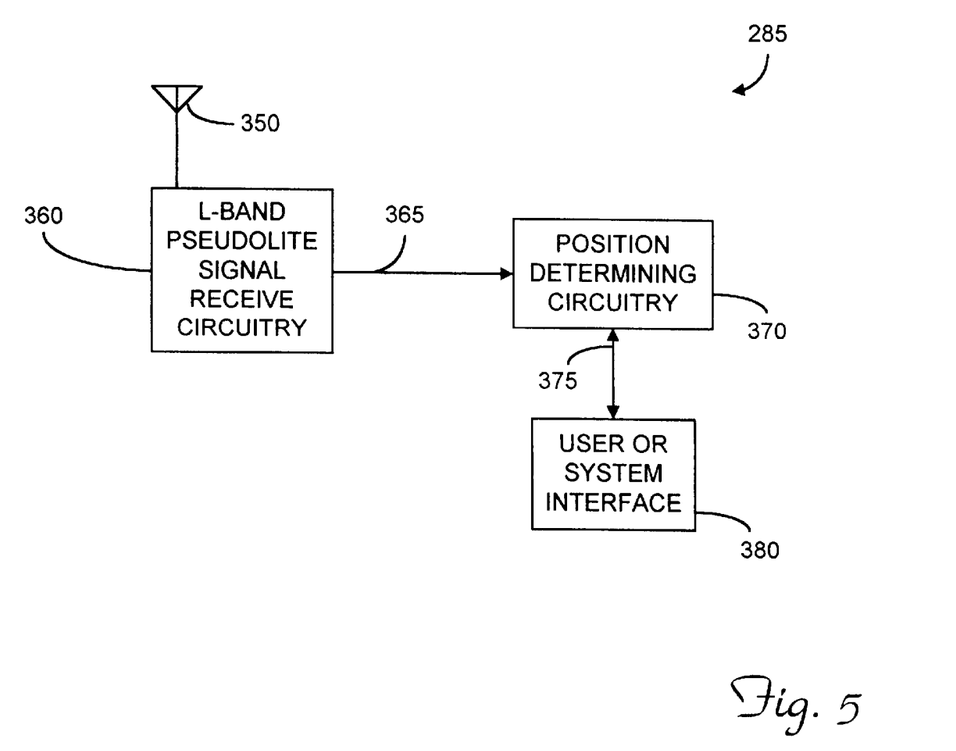
FIG. 5 is a block diagram illustrating an APL navigation system receiver in accordance with the first embodiments of the present invention illustrated in FIG. 3.

FIG. 3 is a diagrammatic illustration of a portion of navigation system 250 in accordance with first embodiments of the present invention. FIGS. 4 and 5 are block diagrams illustrating an APL transmitter and a receiver in accordance with the first embodiments illustrated in FIG. 3. System 250, APL transmitter 255 and receiver 285 illustrated in FIGS. 3–5 are more particular embodiments of system 100, transmitter 110 and receiver 150 illustrated in FIGS. 1 and 2. As shown, in system 250 an APL transmitter 255 is positioned on aircraft 260 which moves along path 265 relative to fixed location 270. Although only one APL transmitter is illustrated in FIG. 3, system 250 can include four or more APL transmitters as shown in FIG. 1.

APL transmitter 255 is illustrated in greater detail in FIG. 4 and includes GNSS receive antenna 300, GNSS receiver 310, controller 320, pseudolite signal generator 330 and pseudolite transmit antenna 340. With GNSS receiver 310 providing continuously or frequently updated actual position information to controller 320 via connections 315, controller 320 of APL transmitter 255 determines vector error correction 275 between fixed point 270 and actual location 266. Having determined vector error correction 275 as a function of GNSS satellite position information, controller 320 controls pseudolite signal generator 330 (via connections 325) to generate a corrected code signal 280 for transmission over antenna 340. Corrected code signal 280 is, in one embodiment, an L-band GPS format signal having its code phase modified. The corrected code signal can also be a signal having a frequency which is not L-band, but which has a GPS signal structure and its code phase modified. The code of corrected code signal 280 is modified such that, as seen from the position of receiver 285, signal 280 will actually appear from a timing perspective to have been transmitted from fixed location 270. This approach requires an approximate knowledge of the position of receiver 285. The position errors increase as the true location of receiver 285 diverges from the position that the APL assumed for the receiver.

Using the corrected code technique illustrated in FIG. 3 and described above, receiver 285 illustrated in FIG. 5 requires very little modification from existing GPS receivers. Receiver 285 includes GNSS antenna 350, L-band pseudolite signal receive circuitry 360, position determining circuitry 370 and interface 380. Signal receive circuitry 360 receives corrected code signal 280 via receive antenna 350, and provides output 365 based upon the received corrected code signal. Position determining circuitry 370 receives the information from signal receive circuitry 360 and determines a position of receiver 285. Position determining circuitry 370 compares the pseudo-random codes in the corrected code pseudolite signals to local codes. Circuitry 370 then determines the "apparent" time delay from the transmission of the pseudolite signal to the reception of the pseudolite signal. Since corrected code signal 280 appears to have been transmitted from fixed location 270, instead of from a moving APL transmitter, position determining circuitry 370 needs only to be modified such that it can adapt to the fixed location described in the APL transmission as discussed above. Additionally, circuitry 370 can also demodulate the pseudolite signal to obtain data messages modulated on the pseudolite signal.

User or system interface 380 is coupled to position determining circuitry 370 via connections 375. Interface 380 can be an input device, a display device for displaying navigation information, an interface between receiver 285 and other electronic systems, or any other type of human or machine interface.

Figure 6:
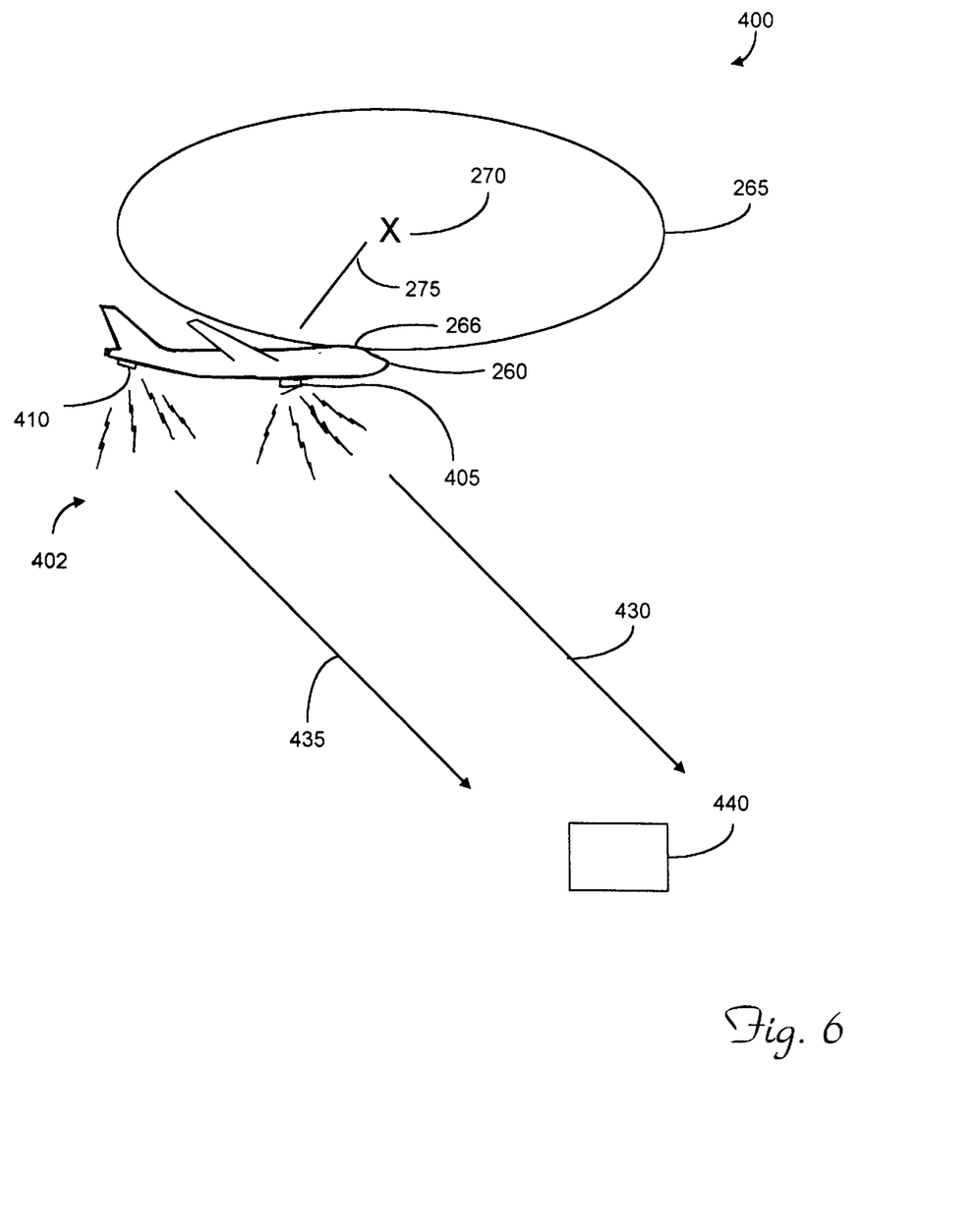
FIG. 6 is a diagrammatic illustration of a portion of an APL navigation system in accordance with second embodiments of the present invention.
Figure 7:
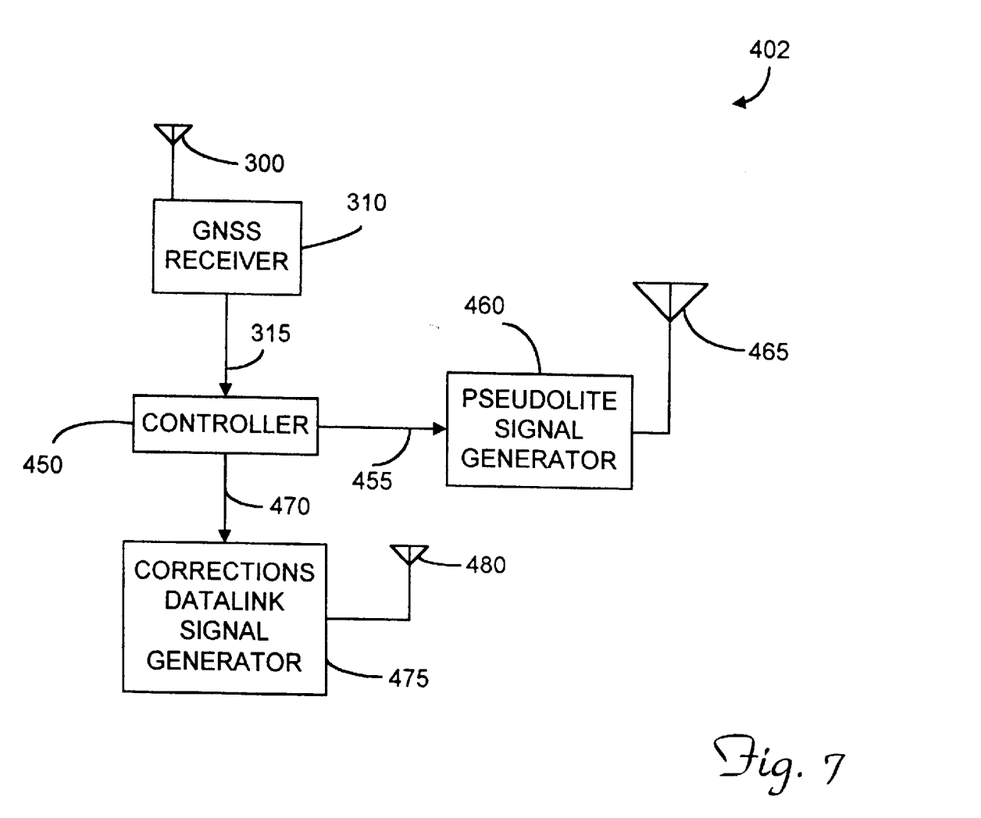
FIG. 7 is a block diagram illustrating an APL transmitter in accordance with the second embodiments of the present invention illustrated in FIG. 6.
Figure 8:
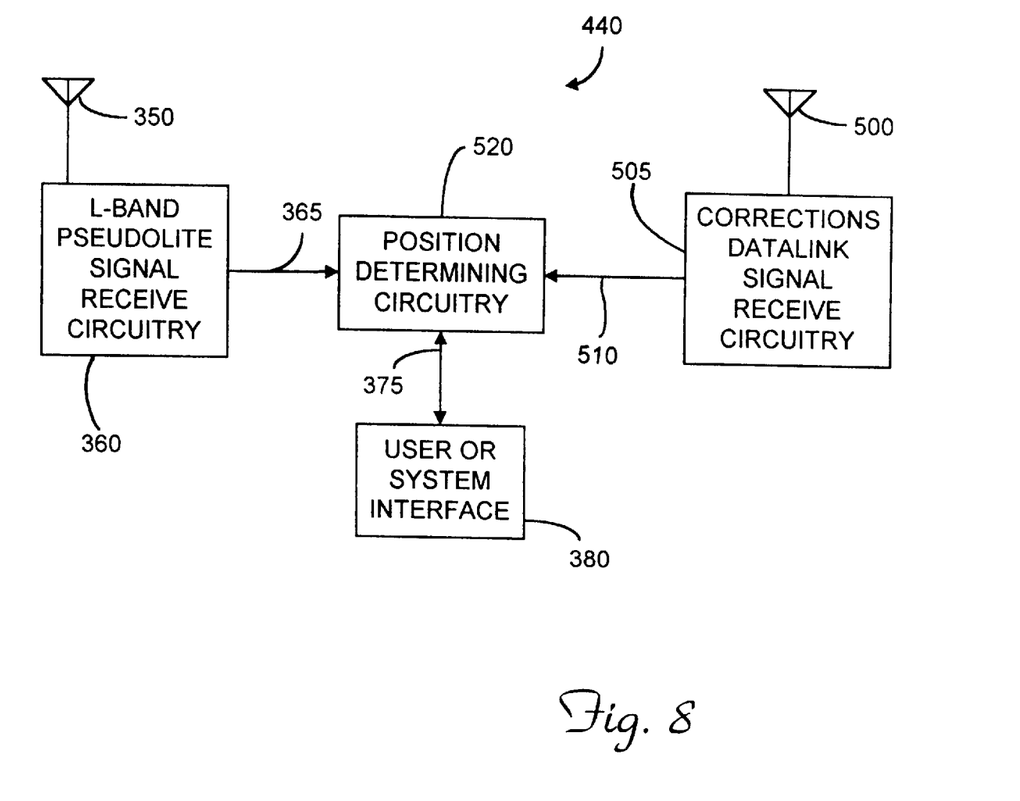
FIG. 8 is a block diagram illustrating an APL navigation system receiver in accordance with the second embodiments of the present invention illustrated in FIG. 6.

FIG. 6 is a diagrammatic illustration of a portion of APL navigation system 400 in accordance with second embodiments of the present invention. FIGS. 7 and 8 are block diagrams illustrating an APL transmitter and receiver in accordance with the second embodiment illustrated in FIG. 6. System 400, transmitter 402 and receiver 440 are more particular embodiments of system 100, transmitter 110 and receiver 150 illustrated in FIGS. 1 and 2. Like navigation system 250 illustrated in FIG. 3, navigation system 400 includes an APL transmitter positioned on aircraft 260 following flight path 265 in the area of fixed location 270. The APL transmitter again determines vector error correction 275 between actual location 266 and fixed location 270. System 400 differs from system 250 in that APL transmitter 402 includes two transmitters transmitting different signals for different purposes. APL transmitter 402 includes transmitter 405, which is preferably an L-band transmitter transmitting GPS format ranging signal 430. APL transmitter 402 also includes corrections datalink transmitter 410 which transmits a corrections datalink signal 435. Corrections datalink transmitter 410 need not be an L-band RF transmitter, but instead can be any type of transmitter capable of transmitting corrections information to receiver 440.

In system 400, APL L-band signal 430 is preferably of a standard GPS format, but describes fixed location 270 instead of current location 266 of APL transmitter 402. Corrections datalink signal 435 transmits corrections information which is used by receiver 440 to correct for the geometric errors associated with transmitting from position 266 while describing fixed location 270. This approach does not require APL knowledge of the position of receiver 440.

FIG. 7 illustrates one possible embodiment of APL transmitter 402 illustrated in FIG. 6. Like APL transmitter 255 illustrated in FIG. 4, APL transmitter 402 includes GNSS antenna 300 and GNSS receiver 310. Transmitter 402 also includes controller 450, pseudolite signal generator 460, pseudolite L-band transmission antenna 465, corrections datalink signal generator 475 and datalink transmission antenna 480. Controller 450 receives position information from GNSS receiver 310 via connections 315, and continuously or repetitively computes vector error correction 275 between fixed location 270 and actual current position 266 as the aircraft moves along the flight path. In APL transmitter 402, controller 450 controls (via connections 455) pseudolite signal generator 460 to transmit L-band ranging signal 430 via antenna 465. Signal 430 includes the modified ephemeris data describing fixed location 270. At the same time, controller 450 controls (via connections 470) corrections datalink signal generator 475 in order to transmit the corrections datalink signal 435 over antenna 480.

FIG. 8 is a block diagram illustrating one possible embodiment of receiver 440 illustrated in FIG. 6. Like receiver 285 illustrated in FIG. 5, receiver 440 includes GNSS antenna 350, L-band pseudolite signal receive circuitry 360 and user or system interface 380. Receiver 440 also includes corrections datalink antenna 500 and corrections datalink signal receive circuitry 505. Using L-band signals 365 from receive circuitry 360 which are indicative of fixed location 270, as well as using signals 510 from corrections datalink signal receive circuitry 505 which are indicative of the necessary corrections information, position determining circuitry 520 determines a position of receiver 440 for use in navigation.

The APL position correction data can be formatted and transmitted (via signal 435) in a number of different ways. One option is a modified version of Differential GPS (DGPS) data formats such as Message Type-3. Normal usage of Message Type-3 is to provide the coordinates of a ground station providing corrections for use by receivers. In the proposed system, Message Type-3 would represent the coordinates of the true APL location 266 for a given time. Receiver 440 would be responsible for determining the pseudorange offset error 275 associated with the 'true' APL transmitter position 266 compared to the fixed position 270 embedded in the L1 frequency downlink signal 430. The corrections datalink message would be transmitted to all pseudolite receivers within operation range.

A second option would be to provide a unique vector offset message structure in signal 435. A new data word can be created for broadcast on the corrections datalink signal 435. This word would describe a three dimensional position vector 275. The receiver would be responsible for determining the 'true' APL position 266 (and corresponding pseudorange offset) by adding the vector offset to the fixed position location 270. This approach offers the benefit of not needing to encrypt the corrections datalink for secure operations.

A third simplified version of this approach is to eliminate the usage of the APL pseudolite broadcasts (signal 430) for APL position determination, and instead only use the L1 transmission as a time reference ranging signal. The true position 266 of the APL would be provided solely by the corrections data link signal 435. This approach would simplify the concept and the pseudolite transmitter, but result in additional modifications to the pseudolite receiver 440. The use of DGPS style data correction formats can potentially greatly reduce additional modifications to existing pseudolite receivers (DGPS capable), other than the basic pseudolite modifications required for description of a fixed location instead of a decaying satellite orbit. The intent of the standard DGPS correction message is altered from providing GPS satellite pseudorange error as measured by a ground reference receiver to providing information for computing the true location of the APL.

Although the present invention has been described with reference to preferred embodiments, workers skilled in the art will recognize that changes may be made in form and detail without departing from the spirit and scope of the invention. For example, while components of the present invention are described as being circuitry, it is understood that the functions performed will typically be implemented using a suitably programmed microprocessor or other software or firmware programmable device.

What is claimed is:

1. A positioning system comprising:
    a first airborne pseudolite transmitter moving relative to a first fixed location, the first fixed location being spaced apart from a current actual position of the first airborne pseudolite transmitter, the first airborne pseudolite transmitter transmitting a first spread spectrum signal containing information which is indicative of the first fixed location; and
    a second navigation transmitter transmitting a second spread spectrum signal;
    a third navigation transmitter transmitting a third spread spectrum signal; and
    a receiver adapted to receive the first, second and third spread spectrum signals and to determine a position of the receiver as a function of the first, second and third spread spectrum signals.

2. The navigation system of claim 1, wherein the second and third navigation transmitters are second and third airborne pseudolite transmitters, respectively, wherein the second airborne pseudolite transmitter moves relative to a second fixed location spaced apart from the first fixed location and from a current actual position of the second airborne pseudolite transmitter, wherein the third airborne pseudolite transmitter moves relative to a third fixed location spaced apart from the first and second fixed locations and from a current actual position of the third airborne pseudolite transmitter, the second and third spread spectrum signals containing information which is indicative of the second and third fixed locations, respectively.

3. The navigation system of claim 1, wherein the second and third navigation transmitters are global navigational satellite system transmitters transmitting satellite ranging signals.

4. The navigation system of claim 1, wherein the first spread spectrum signal has a standard global navigational satellite system message structure, the message structure including modified ephemeris data to reflect a fixed nature of the first fixed location.

5. The navigation system of claim 4, wherein the modified ephemeris data includes ephemeris constants selected to sum to a fixed position.

6. The navigation system of claim 5, wherein the receiver utilizes Keplerian equations with the time varying constants removed to calculate the first fixed location.

7. The navigation system of claim 4, wherein the first airborne pseudolite transmitter modulates the first spread spectrum signal using a first code, wherein the receiver is adapted to determine a first distance as a function of a time delay between the first code in the received first spread spectrum receiver and a reference code, and wherein the first airborne pseudolite transmitter is adapted to modify the first code such that the first distance determined by the receiver is a distance between the receiver and the first fixed location.

8. The navigation system of claim 4, wherein the first airborne pseudolite transmitter is adapted to determine a vector error correction between the first fixed location and the current actual position of the first airborne pseudolite transmitter, the first airborne pseudolite transmitter transmitting a second signal containing correction data indicative of the vector error correction for use by the receiver in determining the position of the receiver.

9. The navigation system of claim 8, wherein the second signal is a modified differential GPS Message Type-3 signal adapted to identify coordinates of the current actual position of the first airborne pseudolite transmitter.

10. The navigation system of claim 8, wherein the second signal contains at least one data word identifying the vector error correction.

11. An airborne pseudolite transmitter for use in transmitting positioning signals to a receiver in a pseudolite navigation system, the airborne pseudolite transmitter comprising:

a first transmitter adapted to transmit an L-band ranging signal; and a second transmitter adapted to transmit a corrections signal, wherein the receiver determines its position as a function of the L-band ranging signal and of the corrections signal.

12. The airborne pseudolite transmitter of claim 11, wherein the airborne pseudolite transmitter is adapted to be moved relative to a first fixed location spaced apart from a current actual position of the first airborne pseudolite transmitter, the L-band ranging signal transmitted by the first transmitter containing information describing the first fixed location.

13. The airborne pseudolite transmitter of claim 12, wherein the L-band ranging signal has a standard global navigational satellite system message structure, the message structure including modified ephemeris data to reflect a fixed nature of the first fixed location.

14. The airborne pseudolite transmitter of claim 13, wherein the modified ephemeris data includes ephemeris constants selected to sum to a fixed position.

15. The airborne pseudolite transmitter of claim 13, wherein the first transmitter modulates the L-band ranging signal using a first code, the first code being modified such that, from a timing perspective of the receiver receiving the L-band ranging signal, the L-band ranging signal appears to have been transmitted from the first fixed location.

16. The airborne pseudolite transmitter of claim 13, and further comprising vector error correction determining circuitry coupled to the second transmitter and adapted to determine a vector error correction between the first fixed location and the current actual position of the airborne pseudolite transmitter, the correction signal transmitted by the second transmitter containing correction data indicative of the vector error correction.

17. The airborne pseudolite transmitter of claim 16, wherein the corrections signal is a modified differential GPS Message Type-3 signal adapted to identify coordinates of the current actual position of the airborne pseudolite transmitter.

18. The airborne pseudolite transmitter of claim 16, wherein the corrections signal contains at least one data word identifying the vector error correction.

19. The airborne pseudolite transmitter of claim 11, wherein the first transmitter is adapted to transmit an L-band time referenced ranging signal, and wherein the corrections signal transmitted by the second transmitter is descriptive of an actual current position of the airborne pseudolite transmitter.

20. A method of determining a position of a receiver, the method comprising:

transmitting from an airborne pseudolite transmitter a first spread spectrum signal, the airborne pseudolite transmitter moving relative to a first fixed location spaced apart from a current actual position of the airborne pseudolite transmitter, the first spread spectrum signal containing information which is descriptive of the first fixed location;

determining a vector error correction between the first fixed location and the current actual position of the airborne pseudolite transmitter;

transmitting from the pseudolite transmitter a corrections signal indicative of the determined vector error correction;

receiving the first spread spectrum signal and the corrections signal with a navigation receiver; and calculating a location of the receiver in response to the received spread spectrum signal and to the received corrections signal.

* * * * *